United States Patent [19]

Shimonou

[11] Patent Number: 4,488,098

[45] Date of Patent: Dec. 11, 1984

[54] POSITION CONTROL SYSTEM FOR A MOVABLE MEMBER

[75] Inventor: Shigeru Shimonou, Tokyo, Japan

[73] Assignee: Nippon Electric Co., Ltd., Tokyo, Japan

[21] Appl. No.: 379,356

[22] Filed: May 18, 1982

[30] Foreign Application Priority Data

May 18, 1981 [JP] Japan .................................. 56-74420

[51] Int. Cl.³ ............................................. G05B 13/00
[52] U.S. Cl. .................................... 318/561; 318/616; 318/617
[58] Field of Search ........................ 318/561, 615–618, 318/590, 591, 600, 603, 612, 638, 652, 685, 362, 363, 445, 461, 466

[56] References Cited

U.S. PATENT DOCUMENTS

| 4,042,868 | 8/1977 | Rhodes | 318/615 |
| 4,250,438 | 2/1981 | Onoda | 318/561 |
| 4,355,272 | 10/1982 | Wise | 318/561 |
| 4,369,400 | 1/1983 | Turner et al. | 318/561 |
| 4,402,387 | 9/1983 | Tsuji et al. | 318/561 X |
| 4,404,505 | 9/1983 | Swanson et al. | 318/561 |

Primary Examiner—B. Dobeck
Attorney, Agent, or Firm—Laff, Whitesel, Conte & Saret

[57] ABSTRACT

A position control system has a motor for moving a movable member which is driven, at first, by a non-controlled signal. Responsive to a position error signal which represents a difference between a present position and a commanded position, and to a velocity signal which represents a velocity of the movable member, a deceleration signal is generated for positioning the movable member at the commanded position. When it exceeds a predetermined level, the deceleration signal is applied to the motor, instead of the non-controlled signal.

11 Claims, 3 Drawing Figures

POSITION CONTROL SYSTEM FOR A MOVABLE MEMBER

This invention relates to a position control system for controllably positioning a movable member to a commanded position, and more particularly to a servo system for controllably driving a motor to position the movable member. The movable member may be any suitable device, such as a magnetic head carriage in a magnetic disc system, or an optical head in an optical disc system, or a print head carriage in a printer.

In a position control system, a driving motor is controllably driven for a long-distance movement of the movable member. In an initial velocity control mode, the member moves at a high speed, and then more slowly in a a final positioning control mode. In the velocity control mode, a reference velocity signal is generated in response to the distance between a present position and a commanded position, and the driving motor is driven to follow a reference velocity represented by the reference velocity signal. Because the velocity and acceleration of the movable member at an accelerating mode are not required to be accurate, a source voltage is directly applied to the driving motor, until the velocity reaches to a predetermined value.

In the position control mode, the movable member is decelerated from the high speed movement. To eventually bring the movable member to rest at the commanded position, it is necessary for the velocity to accurately follow the reference velocity, represented by the reference velocity signal. To decelerate, an error signal which is representative of a difference between the reference velocity and the velocity of the movable member is generated and applied to the driving motor. Because a velocity error is usually presented in the decelerating mode, the velocity of the movable member is usually greater than the reference velocity. As a result, there has always been a risk of an unstable operation in which the movable member is not stopped, even if it has reached the commanded position.

A generator for the reference velocity signal responds to the position error and generates a deceleration signal which is representative of a predetermined deceleration, while the velocity of the movable member is accurately following the reference velocity. A greater deceleration is generated when the velocity of the movable member exceeds the reference velocity. The greater deceleration makes the velocity error greater, resulting in the unstable operation in which both of the velocity error and the deceleration are increased.

It is, therefore, an object of the invention to provide a position control system for stably positioning a movable member to a commanded position, at a high speed.

According to this invention, a position control system has a motor for moving a movable member which is driven at first by a non-controlled signal. Responsive to a position error signal which is representative of a difference between a present position and a commanded position, and to a velocity signal which is representative of a velocity of the movable member, a deceleration signal is generated for positioning the movable member to the commanded position. Instead of the non-controlled signal deceleration signal is applied to the motor, when it exceeds a predetermined level.

Other features and advantages of this invention will be apparent from the following description of a preferred embodiment of this invention taken in conjunction with the accompanying drawings, wherein.

Figure 1:
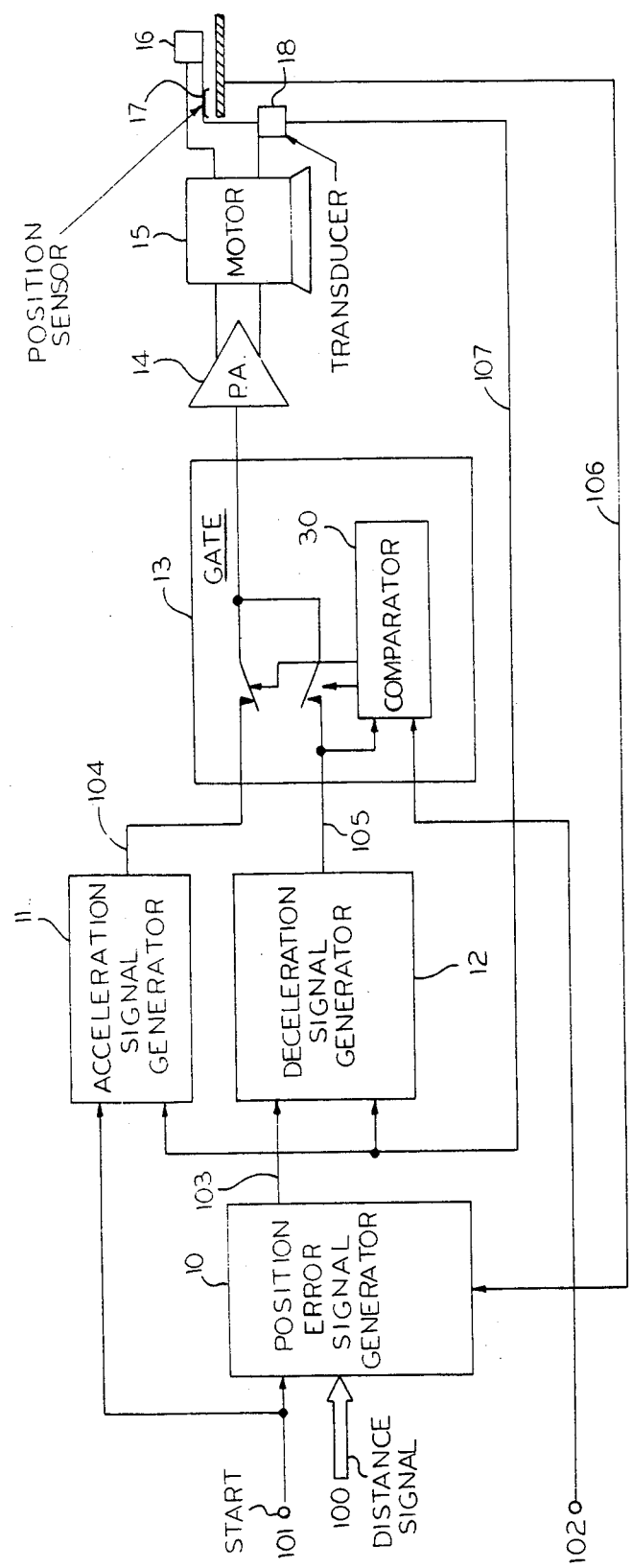
FIG. 1 is a block diagram of an embodiment of this invention.

FIG. 1 shows a magnetic disc system. According an embodiment of this invention, a magnetic head 16 of a movable member is moved by driving a driving motor 15, in response to a distance signal 100 which is applied from an external control unit (not shown) to a position error signal generator 10. The error signal represents a distance between a present position of the head 16 and a commanded position. When the external control unit applies a start signal over wire 101 to the position error signal generator 10 and to an acceleration signal generator 11, a position error signal from generator 10 appears on wire 103. An acceleration signal is generated on wire 104 by the generator 11. Because a gate circuit 13 is normally set so that the acceleration signal on wire 104 is passed therethrough at the start of the operation, the acceleration signal is amplified by a power amplifier 14 and then applied to the driving motor 15. At the acceleration mode, it is unnecessary to control the velocity and the acceleration of the head 16. Therefore, the amplified acceleration signal may be a DC voltage having a level sufficient to apply the maximum current to the motor 15.

The present position of the head 16 is detected by a position sensor 17 to produce a position signal, which is fed back over wire 106 to the position error signal generator 10. The position error signal generator 10 generates the position error signal on wire 103, by subtracting the position signal or wire 106 from the distance signal 100. The position error signal generator 10 is composed of a counter for counting down the distance signal 100 responsive to the position signal on wire 106, such as a track-crossing pulse and a digital-to-analog converter. In case where a signal continuously representing the position of the head 16 is obtained as the position signal 16, a subtractor may be used as the position error signal generator 10.

The velocity of the head 16 or the motor 15 is detected by the transducer 18 to produce a velocity signal on wire 107. This signal is applied to the acceleration signal generator 11 and to a deceleration signal generator 12. The velocity signal on wire 107 may be produced by differentiating the position signal on wire 106, without employing the transducer 18.

To limit the maximum velocity of the head 16 to a predetermined value, when the velocity signal on wire 107 exceeds a preset vaue, the acceleration signal on wire 104 becomes to zero level in the generator 11 to stop the acceleration. If friction at the movement of the head 16 is negligible small, the head continues to move at the maximum velocity, even after the stop of the acceleration.

The deceleration signal generator 12 operates responsive to the position error signal on wire 103 and the velocity signal on wire 107. Generator 12 calculates the deceleration which is necessary to position the head 16 at the commanded position and produces the deceleration signal on wire 105, for providing the calculated deceleration by the driving motor 15. Assuming that the velocity of the head 16, the distance to the commanded position, and the deceleration necessary to move the head at the commanded position are represented by $V_0$, $X_e$ and $A_0$, respectively, a time period T for stopping head movement is represented by $$T = V_0/A_0$$

The distance $X_e$ by which the head is moved during the time period T is represented by $$X_e = V_0 T - \tfrac{1}{2}(A_0 T^2) = (V_0^2/A_0) - \tfrac{1}{2}(V_0^2/A_0) = \tfrac{1}{2}(V_0^2/A_0)$$

Therefore, the deceleration $A_0$ is represented by $$A_0 = \tfrac{1}{2}(V_0^2/X_e)$$

The deceleration signal generator 12 calculates the above equation to produce the deceleration signal which is applied to wire 105, the signal being representative of the calculated deceleration. It is, therefore, possible to position the head 16 at the commanded position by applying the deceleration signal or wire 105 through the amplifier 14 to the driving motor 15.

If the deceleration is started under the condition where the head 16 is away from the commanded position and the velocity of the head 16 is low, an extremely long time period is required between the start of the deceleration and the final positioning of the head 16. To avoid this, the gate circuit 13 comprises a comparator 30 for comparing the deceleration signal received over wire 105 with a reference level to produce a switching signal when the deceleration signal on wire 105 exceeds the reference level. The switching signal is used for switching the gate so that the acceleration signal which is passing therethrough is stopped and the deceleration signal 105 is passed through the gate circuit 13 to the amplifier 14.

The deceleration starting signal should be applied to the driving motor 15 when the position of the head 16 is as close as possible to the commanded position in order to shorten the time period T. However, the decelerating current which is possible to apply from the power amplifier 14 has a limited value. Therefore, the deceleration starting position must be set so that the current applied responsive to the deceleration $A_0$ does not exceeds the limited value.

Due to the fluctuation of the motor characteristics, the generated deceleration is different from the calculated deceleration. In this case, the deceleration difference between the generated and the calculated decelerations accounts for the difference between the velocity signal on wire 107 and the position error signal on wire 103. The signal difference causes a change in the deceleration signal 105, thereby to accurately position at the commanded position.

When the head 16 has been positioned at the commanded position the external control unit, an end signal over wire 102 to indicate the completion of the positioning applies after, whereby the acceleration signal generator 11 and the gate circuit 13 are reset to the initiating state.

In the above embodiment, the positioning is controlled in response to the deceleration signal on wire 105, until the head 16 has stopped moving. A modification can be performed in which the head is driven by such controlling until the head 16 reaches a position which is sufficiently close to the commanded position, and then it is driven in the position control mode employed in the conventional position control system.

Figure 2:
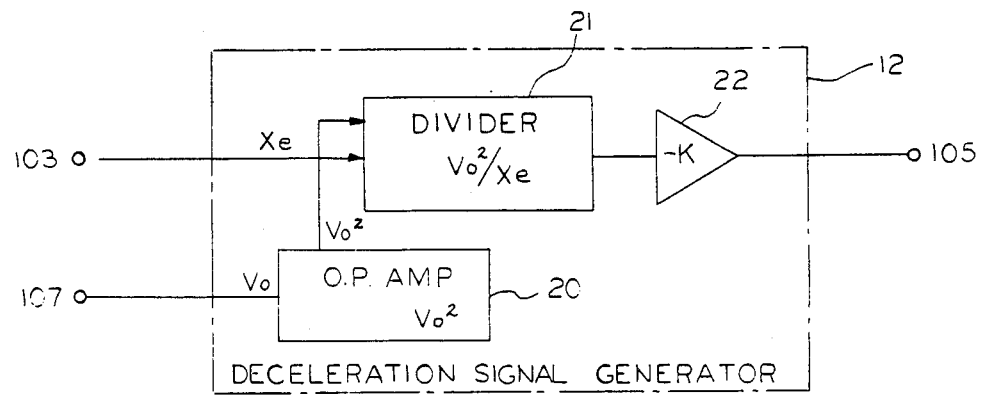
FIG. 2 is a block diagram of a deceleration signal generator used in the embodiment shown in FIG. 1.

Referring to FIG. 2, the deceleration signal generator 12 comprises a square operating amplifier 20, a divider 21, and an amplifier 22. The square operating amplifier 20, which receives the velocity signal over wire 107, representative of the velocity $V_0$, produces a square velocity signal representative of the value $V_0^2$. The square velocity signal ($V_0^2$) is applied together with the position error signal ($X_e$) on wire 103 to the divider 21, in which the division ($V_0^2/X_e$) is achieved to provide a divided value, which is applied to the amplifier 22 to provide the deceleration signal on wire 105 which is representative of the value $A_0 = \tfrac{1}{2}(V_0^2/X_e)$. The square operating amplifier 20 and the divider 21 may be composed of commercially marketed integrated circuits.

In a case where the movable member (the head 16) is accurately decelerated in response to the necessary deceleration signal, the deceleration in the decelerating mode is constant i.e., it is unnecessary to change the deceleration. Further, the deceleration signal on wire 105 does not need to rapidly respond to the change of the velocity signal on wire 103 and to the position error signal on wire 107. This makes it possible to use the square operating amplifier 20 and the divider 21, which have a low-speed response characteristics. Therefore, it is possible to obtain a sufficiently effective deceleration signal even if the position signal on wire 106 and the velocity signal on wire 107 are obtained intermittently, e.g., they are of digital signals.

Figure 3:
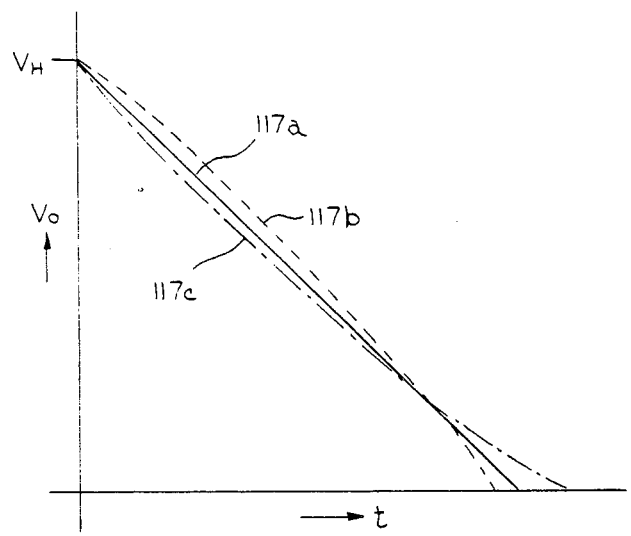
FIG. 3 shows a velocity response in the embodiment shown in FIG. 1.

FIG. 3 shows an example of the velocity response of the head 16 in the decelerating mode. The deceleration is started with a velocity $V_H$ at a time $t = 0$. In a case where the head 16 is decelerated with a characteristic maintaining the equation $A_0 = \tfrac{1}{2}(V_0^2/X_e)$, the velocity $V_0$ is changed with a constant deceleration as shown by a line 117a.

In a case where the deceleration at the start of the decelerating mode is less than the required deceleration, as shown by a dotted line 117b, the velocity is greater at first than that shown by the line 117a. Then, when the head 16 approaches to the commanded position and the gap of the relationship between the velocity and the deceleration signal increases, the deceleration signal on wire 105 is increased, whereby the head 16 is decelerated with a greater deceleration. In this case, during a longer time period $t_2$, the velocity is greater than the duration of the time period $t_1$, which is shown by the line 117a, whereby it is possible to position the head within a shorter time period.

On the other hand, in a case where the starting of the deceleration is greater than the required deceleration, the velocity $V_0$ is deceleration as shown by a line 117c. In this case, a time period $t_3$ is longer than $t_1$.

From a view point with respect only to the time period t, it is preferable to select the deceleration characteristics shown by the line 117b. In this case, however, a great amount of deceleration is required when the head is near the commanded position. As a result, the power amplifier 14 must have a greater capacity for supplying current.

For the stable operation, it is preferable to select the deceleration characteristics shown by the line 117c. This case is obtained, for example, by setting the gain of the amplifier 22 to be a little greater than the required value.

What is claimed is:

1. A system for controlling the positioning of a movable member to a commanded position, said system comprising:

means including a motor for moving said movable member;

first means responsive to the physical position of said movable member for producing a position error signal which is representative of a distance between a present position of said movable member and said commanded position;

second means responsive to the physical position of said movable member for producing a velocity signal representative of a velocity of said movable member;

third means responsive jointly to said position error signal and said velocity signal for producing a deceleration signal which is representative of a deceleration that is necessary to position said movable member to said commanded position by decelerating said movable member from a velocity at said present position; and means for applying said deceleration signal to said motor when a level of said deceleration signal exceeds a predetermined level.

2. The position control system as claimed in claim 1 further comprising means for producing an acceleration signal, said acceleration signal being applied to said motor.

3. The position control system as claimed in claim 1, wherein said velocity of said movable member and said distance between said present position and said commanded position are represented by $V_0$ and $X_e$, respectively, and said deceleration is represented by $A_0$ and the deceleration signal is described by $$A_0 = \tfrac{1}{2}(V_0^2/X_e).$$

4. The position control system as claimed in claim 3, wherein said third means includes a squre operating amplifier and a divider.

5. A system for controlling the position of a movable member, said system comprising means for moving said member from a present position at a controlled speed to a commanded position, means responsive to a detection of the distance between the present and commanded positions for generating a position error signal, tachometer means near and responsive to said member for detecting the velocity at which it moves for generating a velocity signal, means responsive jointly to said error signal said velocity signal for generating a deceleration signal which causes a deceleration of movement that will bring said member from its movement to rest at said commanded position, and comparison means responsive to a reference level for activating said deceleration signal to bring said member to said commanded position when a level of said deceleration signal exceeds said reference level.

6. The system of claim 5 wherein said deceleration signal is described by $$A_0 = \tfrac{1}{2}(V_0^2/X_e)$$

where:

$A_0$ = the deceleration required to bring said member from its movement to rest at said commanded position;

$V_0$ = the detected velocity of said member at the time of deceleration;

$X_e$ = the distance between the present and commanded positions.

7. The system of claim 5 and an acceleration signal generating means for causing said member to accelerate to and move at a high speed, gate means for normally applying said acceleration signal to said means for moving said member, and means responsive to said comparison means for operating said gate means to remove said acceleration signal and substitute therefor said deceleration signal.

8. The system of claim 6 and an acceleration signal generating means for causing said member to accelerate to and move at a high speed, gate means for normally applying said acceleration signal to said means for moving said member, and means responsive to said comparison means for operating said gate means to remove said acceleration signal and substitute therefor said deceleration signal.

9. The system of claim 5 wherein said means for generating a deceleration signal comprises a square operating amplifier driven by said velocity signal and a divider driven jointly by an output of said square operating amplifier and said position error signal.

10. The system of claim 6 wherein said means for generating a deceleration signal comprises a square operating amplifier driven by said velocity signal and a divider driven jointly by an output of said square operating amplifier and said position error signal.

11. The system of claim 6 and means for selectively beginning said deceleration signal at a level which may be greater or lesser than a required level of deceleration in order to select between a faster stop and a requirement for a lesser power utilization.

* * * * *